United States Patent [19]

Hovmand et al.

[11] 4,070,765
[45] Jan. 31, 1978

[54] PROCESS AND APPARATUS FOR CONVERTING A SOLUTION OR SUSPENSION INTO A DRIED PARTICULATE, GRANULATE PRODUCT

[75] Inventors: Svend Hovmand, Horsholm; Erik Liborius, Charlottenlund, both of Denmark

[73] Assignee: Aktieselskabet Niro Atomizer, Soborg, Denmark

[21] Appl. No.: 680,058

[22] Filed: Apr. 26, 1976

[30] Foreign Application Priority Data

Apr. 26, 1975 United Kingdom ............... 17431/75

[51] Int. Cl.² ........................ F26B 3/08; F27B 15/00
[52] U.S. Cl. ........................................ 34/10; 34/12; 34/57 R; 34/60; 432/14; 432/58
[58] Field of Search ............... 34/10, 12, 57 R, 57 A, 34/60, 61; 432/14, 58

[56] References Cited

U.S. PATENT DOCUMENTS

| 2,313,956 | 3/1943 | McGrane | 34/57 R |
| 3,309,785 | 3/1967 | King | 34/57 R |
| 3,740,861 | 6/1973 | Myers | 34/10 |

FOREIGN PATENT DOCUMENTS

| 779,811 | 7/1957 | United Kingdom | 34/243 R |

*Primary Examiner*—John J. Camby
*Attorney, Agent, or Firm*—Dennison, Dennison, Meserole & Pollack

[57] ABSTRACT

A mixer-granulator, preferably a spiral path granulator, is combined with a pneumatic conveyor dryer in a process for converting a solution or suspension into a dried particulate product. In a preferred embodiment, the particles formed in the mixer-granulator show a non-equilibrium moisture distribution with an interior part of lower moisture content and a surface part of higher moisture content.

39 Claims, 1 Drawing Figure

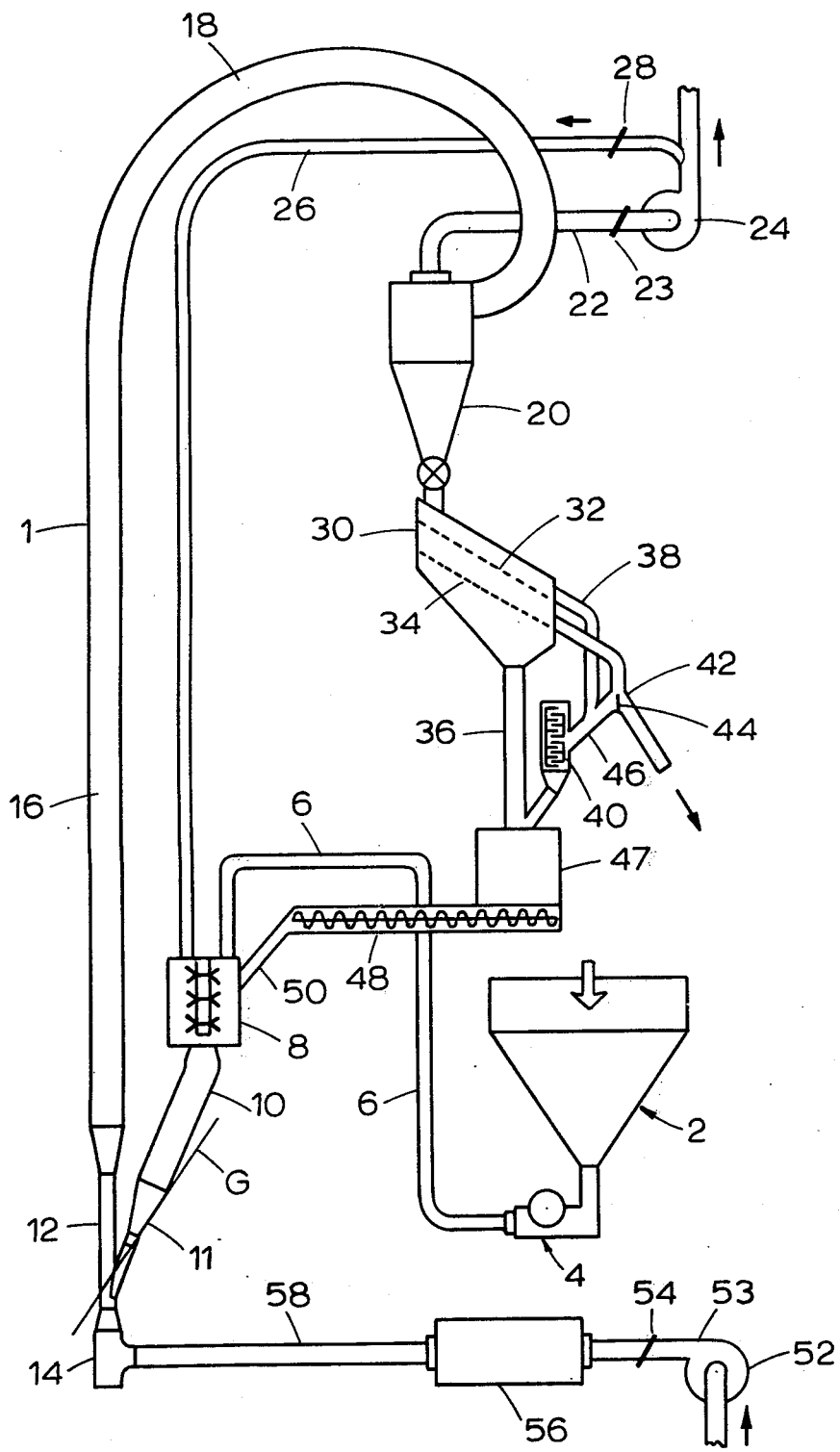

PROCESS AND APPARATUS FOR CONVERTING A SOLUTION OR SUSPENSION INTO A DRIED PARTICULATE, GRANULATE PRODUCT

BACKGROUND OF THE INVENTION

The present invention relates to a process and an apparatus for converting a solution or suspension into a dried particulate, granulate product.

Pneumatic conveyor dryers (also called "flash dryers") are used for various industrial drying processes. Pneumatic conveyor dryers are described, e.g., in Chemical Engineers' Handbook, fifth edition, McGraw-Hill Book Company, 20-55, and consist of a long tube or duct for carrying a gas at high velocity, a fan or other means to propel the gas, a feeder for addition of the material to be dried and for dispersing such material in the gas stream, and a cyclone or other separation means for separating dried solid particles from the gas. In the usual embodiments of pneumatic conveyor dryers, either the feeder means or the inlet part of the tube or duct comprises means such as grinders, dispersion means, cage mills or rotating paddle means, which will disintegrate particles or particle aggregates fed thereto so that the product being dried will usually have a smaller particle size than the feed. Normally, particles dried in a pneumatic conveyor dryer have a particle size of 50–300 $\mu$.

It has now been found that a pneumatic conveyor dryer may advantageously be used for a drying process to obtain a dried particulate product of granular character in which, as a total result, the feed material is not disintegrated to a smaller particle size, but rather "built up" and granulated to obtain an end product consisting of discrete particles of larger particle size than is normally produced in a pneumatic conveyor dryer, the final particles consisting of a plurality of single fragments joined together. One interesting embodiment of the process yields a granulate product consisting of particles of a very uniform particle size and of a substantially spherical shape, the particles having a mean particle size of 300–1000 $\mu$, usually 500–900 $\mu$. Such uniform granulate product of the particle size stated and of a free-flowing, non-dusting character, attractive appearance and high bulk density, may be a most useful form of various commercial products, one interesting example being the so-called "single cell protein" materials which may be used, e.g., in animal feed.

SUMMARY OF THE INVENTION

The process according to the invention for converting a solution or suspension into a dried particulate product comprises mixing the solution or suspension with recycled material, consisting of dried particulate material of smaller particle size than the desired final product, in a mixer-granulator to obtain particles of a higher moisture content than the desired final product, feeding the resulting particles into and conveying them through a pneumatic conveyor dryer without any substantial disintegration of the particles, classifying dried particulate product discharged from the pneumatic conveyor dryer into a fraction of desired particle size range, an undersize fraction, and, if present, an oversize fraction, withdrawing particles of desired size range as final product, disintegrating oversize particles, if any, and recycling the disintegration product together with undersize particles into the mixer-granulator.

DETAILED EXPLANATION OF THE INVENTION

The above-mentioned "mixer-granulator" is an apparatus which is capable of mixing a solution or suspension with a particulate product in such a manner that the resulting mixture is a particulate or "granular" product built up from the solution or suspension and the particles. Various mixer-granulators are known. For the purpose of the present invention, the mixer-granulator should preferably be one in which the mixing-granulating process is completed within seconds or fractions of seconds, and suitable mixer-granulators for use in the process of the present invention are high speed rotary mixer-granulators such as an upright spiral path granulator of the type discribed in the March/April 1972 issue of "Phosphorus & Potassium", published by the British Sulphur Corporation Ltd., Parnell House, 25 Wilton Road, London SW1V 1NH, England.

Such spiral path granulators are manufactured by Schuurmans & Van Ginneken and are commercially available under the name "SCHUGI".

It is an essential feature of the present invention that the particles formed in the mixer-granulator are fed to and conveyed through the pneumatic conveyor dryer without any substantial disintegration of the particles, which is in contrast to the conventional pneumatic conveyor drying wherein disintegration normally occurs at one or more stations in the particle flow. It is evident that a pneumatic conveyor dryer suitable for use in the process according to the present invention will, accordingly, not comprise disintegration means or other means which in effect would result in a disintegration of the particles conveyed through the dryer. The feeding of the particles formed in the mixer-granulator into the pneumatic conveyor dryer is advantageously performed by allowing the particles to simply fall through a tube or duct into the drying tube or duct of the pneumatic conveyor dryer essentially by gravitational pull. As the particles leaving the mixer-granulator have a relatively high moisture content and in one embodiment of the invention, which will be explained further below, show a non-equilibrium moisture distribution with an interior of less moisture content and a surface part of higher moisture content, the tube or duct through which the particles fall from the mixer-granulator into the pneumatic conveyor dryer should be so designed that it presents no substantial obstruction to the free fall of the particles as, otherwise, the exteriorly moist particles would tend to stick to each other and to the obstructing tube or duct parts. In practice, this means that the tube or duct, or at any rate the parts of the tube or duct which are so positioned that they might obstruct the transportation of the particles by gravitational pull, this being, at any vertical section of the tube or duct, the lower part thereof, should be as close to vertical as possible, taken along any generatrix. (The term "generatrix" is used here in a broad sense and comprises not only the proper generatrix of a body of revolution such as a tube, but also analogously covers a line parallel to the longitudinal direction of e.g., a duct having a rectangular cross-section. Moreover, it is to be understood that in cases where e.g. a tube is curved, it will not be a proper body of revolution, but for the purpose of the present definition such curved tube could be considered as consisting of several increments each being a proper body of revolution, each small increment having its proper generatrix). According to the present invention, the necessary freedom of obstruction to the gravitational pull transportation of the particles from the mixer-granulator into the pneumatic conveyor dryer is obtained when the lower generatrix of the tube or duct defines an angle with vertical of no more than 35°, more preferably less than 25°. The ideal would of course be a substantially vertical tube or duct from the mixer-granulator to the pneumatic conveyor dryer, but as the drying tube or duct of the pneumatic conveyor dryer is usually arranged in a vertical or substantially vertical position, design limits regarding the height of the installation will normally dictate an angle of the feeding tube or duct which is at least 10°, e.g. in the range of 10°–25°, and in practical embodiments preferably 15°–20°. A relatively small angle, of the sizes mentioned above, between the drying tube or duct of the pneumatic conveyor dryer and the tube or duct through which the particles pass from the mixer-granulator into the drying tube or duct is also advantageous for the reason that the sudden shift in velocity and direction encountered when the particles pass into the drying tube or duct will tend to break up any large lumps which might occasionally have been formed due to irregularities in the material flow.

The granulating effect achieved by the process according to the present invention is believed to depend at least partially upon a relatively high degree of recycling. Normally, the relative amount of recycled material to feed solution or suspension will be above 5:1, calculated on dry solids basis. Oversize particles discharged from the pneumatic conveyor dryer are disintegrated into smaller particles which are recycled together with undersize particles, and depending upon the process parameters, it may be necessary or desirable to disintegrate and recycle also part of the particles having the particle size range which is specified for the desired end product. It will be within the realm of the skilled art worker to ascertain the degrees of recycling of the various fractions which will result in a stable process yielding a specified desired product.

The suspension or solution fed to the mixer-granulator will have a total solids content in the range of 10–75% by weight, depending upon the identity and character of the solid and the liquid. In most practical applications, the liquid will be water. If the solid is, e.g., a finely divided mineral material such as clay, silicates, or the like between the mixer-granulator (which builds up particles) the suspension may be sufficiently dryable and suitable for the process of the present invention at high solids contents in the upper range of the interval stated above, whereas with suspensions of various organic materials, solids contents in the lower range of the interval will often inherently be required. The total solids content of the recycled material will normally be 80–100% by weight.

One important embodiment of the process of the invention, yielding the above-mentioned substantially spherical particles, is characterized in that the particle size distribution of the recycled material and the relative amounts of recycled material and solution or suspension are so selected that the particles formed in the mixer-granulator and passed into the conveyor dryer show substantially a non-equilibrium moisture distribution with an interior part of lower moisture content and a surface part of higher moisture content. In this embodiment of the invention, a single small particle initially formed in the mixer-granulator will be recycled through the system several times, e.g., about 20–25 times, before it is withdrawn as end product. Each time the particle emerges from the separation means of the pneumatic conveyor dryer, e.g. a cyclone, as an undersize particle, i.e. a particle which will be classified in the undersize fraction by the classifying means inserted in the circuit, e.g. a set of screens, it will be passed into the mixer-granulator where a new layer of solution or suspension is applied to the particle, whereafter the particle is passed into the pneumatic conveyor dryer, and the newly applied moist layer is dried. In this manner, this embodiment of the process of the invention builds up the single particles of the granulated product by applying a layer of moisture on the exterior of the particle and drying the layer in each cycle. In other words, in this embodiment of the invention, the preliminary stages of the spherically shaped particles are formed in the mixer-granulator, and it is believed that the shaping of the particles, resulting in the formation of spherical granules, continues through the entire pneumatic conveyor dryer, especially curvatures of the drying duct and the curved walls of the cyclone, the shapeability of the particles being probably dependent upon a relatively high degree of plasticity of their moist exterior. The fact that the particles show essentially a non-equilibrium moisture distribution with an interior part of lower moisture content and a surface part of higher moisture content is also believed to be the reason why it has at all been found possible to dry such unusually large size particles in a pneumatic conveyor dryer, and furthermore, the non-equilibrium moisture distribution with an exterior of relatively high moisture content also permits the use of drying air at a high temperature and hence the obtainment of good heat economy, without thermal deterioration of the product. The fact that the particles emerging from the mixer-granulator in this embodiment show a non-equilibrium moisture distribution has, in connection with the drying of a single cell protein suspension, been demonstrated by withdrawing a sample of the particles produced in the mixer-granulator. In the fresh sample, the particles are very plastic and sticky and may easily be compressed into a coherent mass, whereas after standing for a few minutes, the particles have become non-sticky and appear dry. It will be understood that due to the relatively high moisture and stickiness of the exterior of the particles in this embodiment of the invention, the above-mentioned feature, that the particles should fall from the mixer-granulator into the pneumatic conveyor dryer without any substantial obstruction, is highly preferred.

When the process of the invention is operated in accordance with the above-mentioned embodiment, the total solids content of the feed solution or suspension is suitably 15–35% by weight, while the total solids content of the recycled material is suitably 85–95% by weight. When the feed is a single cell protein suspension, the selected ratio of the relative amount of recycled material having a total solids content in the stated range of 85–95% by weight to feed suspension having a total solids content in the stated range of 15–35% by weight will be 20–30:1 calculated on dry solids basis, and the selected particle size distribution of the recycled materials will be one in which at least 90% by weight of the recycled material has a mean particle size which is 70–95% of the mean particle size of the final product, especially 80–90% of the mean particle size specified for the final product withdrawn.

In another embodiment of the process of the invention, the particle size distribution of the recycled material and the relative amounts of recycled material and solution or suspension are so selected that the particles formed in the mixer-granulator show substantially a non-equilibrium moisture distribution with an interior part of higher moisture content powdered with fragments of lower moisture content. Also here, it is preferred that the total solids content of the feed solution is 15-35% by weight, and that the total solids content of the recycled material is 85-95% by weight. In this embodiment of the process of the invention, the resulting granulate end product will show a lower bulk density than the substantially spherical product obtained in the first-mentioned embodiment and will consist of more porous and irregularly shaped particles of a size of 300-100 $\mu$, typically 500-900 $\mu$. When, e.g., the product is a single cell protein for use in animal feed, this configuration of the particles may be advantageous in that it yields, by admixture with other fodder components a stable product which does not separate. In this embodiment, it is essential to recycle a sufficient amount of sufficiently small particles to "powder"a liquid droplet or a relatively wet aggregate of particles with small fragments when building up the resulting particles to be conveyed through the conveyor dryer. When the feed is a single cell protein suspension, the selected ratio of the relative amount of recycled material having a total solids content of 85-95% by weight to feed suspension having a total solids content of 15-35% by weight is 10-20:1, calculated on dry basis, and the selected particle size distribution of the recycled material is one in which at least 10% by weight, and especially 15-25% by weight, of the recycled material has a mean particle size which is smaller than 25% of the mean particle size of the final product.

In the process according to the present invention, the velocity of the drying air in the pneumatic conveyor dryer is preferably high, and suitable air velocities are 40-100 m/second measured at the throat or inlet section of the pneumatic conveyor dryer duct or tube and at the air inlet temperature, and, corresponding to this, 8-20 m/sec. in the conveyor dryer duct or tube proper. Especially preferred air velocities are 50-80 m/sec. in the throat section and, correspondingly, 10-16 m/sec. in the duct.

The inlet temperature of the drying air is suitably 250-600° C, and from heat economy considerations, it is preferred to keep a rather high drying air inlet temperature such as 400-500° C.

In order to avoid an uneven velocity profile of the drying air and the conveyed particles in the pneumatic conveyor dryer duct, it is preferred to introduce the drying air into the throat section of the pneumatic conveyor dryer in a state of turbulent flow. Such turbulent flow of the drying air introduced may be obtained by any suitable means, e.g. by obstructing the inlet air flow such as passing it into the throat section of the pneumatic conveyor dryer through a right angle tube joint.

British patent specification No. 1,119,078 discloses a process for granulating a paste by spraying it onto fines recycled from a prior operation, in which process the fines are evenly distributed over the cross sectional area of the upper end of an enclosure having a substantially vertical axis of symmetry so that they fall by gravity along paths which are substantially parallel to the axis of symmetry of the enclosure, and a gaseous flow stream is introduced into the enclosure in a direction substantially parallel to the path of the fines, and the paste to be granulated is projected onto the fines or cores during their fall by means of at least one spraying device which is located on or in the vicinity of the axis of symmetry. Evidently, this process is very distinct from the process of the present invention in essential respects and does not comprise the feature of generating the particles under vigorous mechanical influence, which is one of the main features of the present process and results in very stable particles of high mechanical strength.

British patent specification No. 1,200,242 discloses a process for the agglomeration of a pulverulent material by introducing and dispersing the pulverulent material into a turbulent stream of gas flowing along an arcuate path of relatively small cross-section such that the stream is substantially linear, introducing an agglomerating fluid into the gas stream to form porous agglomerates and transferring the agglomerates directly into a pneumatic conveyor dryer. A very essential difference between the process of British patent specification No. 1,200,242 and the present process is that the feed material of the British specification is the pulverulent material, in other words, the feed is introduced in dry state and the liquid is used for agglomerating the feed particles, whereas in the present process, the feed is derived from the fluid, that is, from the solution or suspension from which the granulates are then generated. Also, the process of the British patent specification uses a special mixing apparatus which is distinct from the spiral path granulator preferably used in the process of the present invention, and the British specification does not show or indicate the preferred feature of essentially gravitational pull transportation of the particles from the mixer-granulator to the pneumatic conveyor dryer. The process of the British specification is especially designed for forming a readily soluble or dispersable agglomerates from powdered solids which hydrate rapidly.

German Offenlegungsschrift No. 1,931,272 discloses a pneumatic conveyor dryer having rotary paddles at its feed inlet for avoiding undesired agglomeration of feed and/or caking at the interior dryer wall, and in some of the drawings, the feed tube or duct is so arranged that essentially gravitational pull transportation of the feed into the dryer is possible, in other words, with a lower generatrix of the feed tube or duct defining an angle with vertical within about the same range as is preferred according to the present invention. However, apart from this isolated feature, the German Offenlegungsschrift does not contain any disclosure resembling the essential features of the present invention.

The invention also relates to an apparatus for performing the process described above, said apparatus comprising mixer-granulator means for mixing a solution or suspension with a particulate material, a pneumatic conveyor dryer, means for feeding particles formed in the mixing means into the pnuematic conveyor dryer (said feeding means and said pneumatic conveyor dryer being free of particle disintegration means), means for classifying particles discharged from the pneumatic conveyor dryer, and means for recycling particles from the classifying means into the mixer-granulator. In preferred embodiments of the apparatus, the mixer-granulator is a high speed rotary mixer-granulator, preferably a spiral path granulator, especially an upright spiral path granulator, and the tube or duct for feeding the particles from the mixer-granulator into the pneumatic conveyor dryer is preferably so designed that no part of its lower generatrix defines an angle with vertical of more than 35°. Preferably, the angle is less than 25°, especially 10°-25°, and most preferably 15°-20°. In a preferred embodiment, the apparatus comprises means for obstructing the flow of the heating air upstream the throat section of the pneumatic conveyor dryer so as to obtain turbulent flow of the heating air into said throat section, one practical embodiment of such obstructing means being a right angle tube joint, preferably a T tube section.

The process of the present invention has been performed in pilot scale using a single cell protein suspension ("single cell protein" here designates a material useful as protein source in human or animal nutrition and consisting of cells of yeast or mycelial fungi or of bacteria) as feed suspension, and in the following, the invention will be described in greater detail with reference to the treatment of a single cell protein suspension, but it will be obvious to one skilled in the art that the principle of the invention may also be applied to a variety of other suspensions or solutions which are to be converted into a dried particulate granulate product.

EXPLANATION OF THE DRAWING

Reference is made to the drawing, which schematically represents an embodiment of an apparatus according to the invention.

A pneumatic conveyor dryer 1 comprises, as main components, a drying tube or duct 16, a separating means 20 shown as a cyclone, fans 24 and 52, and an air heating means 56. From a reservoir 2 for feed solution or suspension, feed (exemplified as a single cell protein suspension) is withdrawn and passed, by means of a pump 4, through a line 6 to a mixer-granulator 8 shown as an upright high speed rotary mixer-granulator such as a spiral path granulator. In the mixer-granulator, the single cell protein suspension is mixed with solid recycled material, and the resulting moist particles fall through a tube or duct 10 into a throat section 12 of the drying tube or duct 16 of the pneumatic conveyor dryer 1. Drying air is supplied by a fan 52 through a line 53 equipped with an adjustable damper 54 to a heating means 56 (e.g., an oil or gas burner, an electrical heater or heat exchanger) from where it passes via a line 58 into an obstruction means or turbulency generator 14 shown as a T tube joint. The drying air passes into the throat section of the conveyor dryer and conveys particles from the tube or duct 10 into and through the tube or duct 16. In the embodiment shown in the drawing, part of the tube or duct 16 is curved as shown by the numeral 18. From the drying tube or duct, the mixture of air and dried particles passes into the separating means 20 in which the dried particles are separated from the drying air. The separating means 20 is shown as a cyclone, but also other separating means may be used, e.g., a bag filter. Through a line 22 equipped with an adjustable damper 23, a fan 24 withdraws air from the cyclone, and through a line 26 equipped with a damper 28, part of the air withdrawn by the fan 24 may be passed into the mixer-granulator 8. From the separating means 20, the dried particulate product passes into a classifying means 30, e.g., a vibrating screen set or, as shown, an inclined screen set comprising screens 32 and 34. The screen 32 retains oversize particles, but allows undersize particles and particles having the particle size specified for the desired end product to pass, whereas the screen 34 allows undersize particles to pass, but retains particles of the end product size. Undersize particles pass through a line 36 into a hopper 47. Oversize particles pass through a line 38 into a disintegrating means 40, shown as a pin mill, and the disintegrated product is passed into the hopper 47. Particles of the desired particle size range pass through a line 42 and are withdrawn as desired end product, as indicated by the arrow. However, by means of a product splitter 44, shown as an adjustable damper, part of the particles of the size range specified for the desired end product may be passed into the disintegrator 40 via a line 46. From the hopper 47, the material to be recycled passes to a dosing means 48, e.g., a band conveyor or (as shown) a screw conveyor, from which it is fed through a line 50 into the mixer-granulator 8. It is to be understood that the process and the apparatus of the invention are not to be limited to the flow sheet and apparatus schematically shown in the drawing.

In the drawing, the lower part of a conical section 11 of the tube 10 constitutes the part of the tube which defines the largest angle with vertical. The inclination of the lower generatrix (the said lower generatrix being shown by a line G in the drawing) constitutes the critical parameter with respect to obstruction of the material flow from the mixer-granulator to the throat section of the pneumatic conveyor dryer. In the drawing, the said lower generatrix is shown as having an inclination of 35° from vertical, but as stated above, it is preferred that the said angle is smaller.

In preferred commercial scale apparatus of the invention, the drying tube or duct of the pneumatic conveyor dryer will have a length of about 7-20 meter, including the curved part thereof, if any. If a T tube joint is used as turbulency generator, such as shown in the drawing, its lower part may suitably be closed with a spring-loaded drop which may be adjusted to automatically drop any large lumps collecting in the joint, or to allow manual opening for withdrawal of any lumps and/or inspection. In the operation of the apparatus shown in FIG. 1, the dampers 23, 28, and 54 are preferably adjusted in such a manner that the absolute pressure in such parts of the apparatus interior as the screens, the hopper, the dosing means, and the mixer-granulator is between neutral and slightly reduced (e.g. between $-20$ and $-30$ mm $H_2O$) in relation to the ambient pressure. In this connection, it may be suitable to recycle, through line 26, 0-15% of the total amount of drying air supplied.

In the operation of the apparatus shown in the drawing, the process conditions are adjusted to obtain a stable process with the desired parameters, e.g. the parameters of the above-mentioned preferred embodiments, by adjusting suitable variables such as the rate of feeding from the reservoir 2, the rate of recycling from the dosing means 48, the proportion of particles of the size range specified for the desired end product recycled through the line 46, and the mesh size of the screens 32 and 34. The adjustment of such variables may be performed in known manners, either manually, or automatically.

EXAMPLES

The following examples illustrate the invention:

EXAMPLE 1

A biomass consisting of a single cell protein slurry with 20% solids content was dehydrated and granulated in a plant as illustrated in the drawing.

The mixer-granulator used was a Schugi continuous mixer manufactured by Schuurmans & Van Ginneken, Netherlands.

50 kg/h slurry were introduced into the mixer together with 270 kg/h recycled material consisting of
a. 267.1 kg/h undersize with the following properties:

| | |
|---|---|
| Moisture content: | 10%, |
| bulk density: | 0.65 g/cm³, |
| mean particle size: | 750 μ, |
| fraction below 250 μ: | 3% | and
b. 0.4 kg/h oversize (above 2 mm) and 2.5 kg/h product having a particle size in the range specified for the desired end product, both ground to a fraction with the following properties:

| | |
|---|---|
| Moisture content: | 15%, |
| bulk density: | 0.64 g/cm³, |
| mean particle size: | 220 μ, |
| fraction below 100 μ: | 18%. |

The mixer-granulator-shaft was rotating at a velocity of 2800 rpm.

The velocity of the drying gas in the throat of the pneumatic conveyor dryer was about 70 m/sec, at an inlet temperature of 500° C.

The final product withdrawn from the plant consisted of compact, spherical and smooth particles. The product was free-flowing and non-dusting and had the following properties:

| | |
|---|---|
| Moisture content: | 12.5%, |
| bulk density: | 0.65 g/cm³, |
| mean particle size: | 850 μ, |
| fraction below 750 μ: | 1%. |

The product was afterdried to a residual moisture content of 8% in a conventional vibrated fluidized bed using drying air at 200° C. Apart from the reduced moisture content, the product retained its above-mentioned properties.

EXAMPLE 2

The same plant, the same single cell protein slurry and the same operating conditions as described in Example 1 were used.

50 kg/h slurry were introduced into the mixer together with 142.5 kg/h recycled material consisting of
a. 115.9 kg/h undersize with the following properties:

| | |
|---|---|
| Moisture content: | 11.5%, |
| bulk density: | 0.53 g/cm³, |
| mean particle size: | 480 μ, |
| fraction below 250 μ: | 15% | and
b. 3.6 kg/h oversize (above 2 mm) and 23 kg/h product having a particle size in the range prescribed for the desired final product, both ground to a powder with the following properties:

| | |
|---|---|
| Moisture content: | 22%, |
| bulk density: | 0.52 g/cm³, |
| mean particle size: | 200 μ, |
| fraction below 100 μ: | 20% |

The product withdrawn as final product consisted of porous, irregularly shaped particles. It was rather free-flowing and non-dusting and showed the following properties:

| | |
|---|---|
| Moisture content: | 21%, |
| bulk density: | 0.44 g/cm³, |
| mean particle size: | 780 μ, |
| fraction below 750 μ: | 47%, |
| fraction below 500 μ: | 2%. |

The product was afterdried to a residual moisture content of 8% in a conventional vibrated fluidized ben using drying air at 200° C. Apart from the reduced moisture content, the product retained its above-mentioned properties.

Among the products prepared by the process of the invention, the products prepared by the embodiment exemplified in Example 1, i.e. a granulate product consisting of particles of a very uniform particle size and of a substantially spherical shape, show unique properties and are believed to be novel.

These novel granulate products constitute an aspect of the present invention and may be defined as granulate products comprising granules or nodules of dried single cell protein, said granules or nodules having a mean particle size of 300–1000 μ, and a specific gravity of 1.4–1.8 g/cm³, the bulk density of the granulate product being 0.5–0.7 g/cm³.

Among these novel granulate products, preferred products are products in which the granules or nodules are of a substantially spherical shape, and the mean particle size is 500–900 μ. These novel products according to the invention are remarkable in that they show surprisingly high mechanical strength combined with a very pronounced non-dusting character. These properties are highly desirable in single cell protein products, as the non-dusting character and the exceptional hardness and mechanical strength minimizes the risk that the product should become disintegrated by handling, which is especially valuable in connection with a single cell protein product, because single cell protein products are inherently mucous membrane-irritating, for which reason single cell protein product dust may be dangerous or at least objectionable to persons involved in handling the product and also may render the single cell protein product objectionable to the animals which are to consume the product.

In such granulate products according to the invention, the proportion of particles having a size of less than 300 μ may be kept very low and is usually less than 0.1% by weight of the product. With respect to the particle size distribution within the particle size ranges of 300–1000 μ, or, in a preferred product, 500–900 μ, this may be controlled by proper selection of the mesh sizes of the screens used in the classification of the product, and in some cases, it may be desirable to prepare a product of a very uniform particle size, whereas for other purposes, a product with a somewhat less uniform particle size, within the ranges stated, may be preferred because of its higher bulk density.

The high mechanical strength of the product according to the invention manifests itself in various manners. As indicated above, one manifestation of the mechanical strength is the resistance to disintegration by handling, and another manifestation is a high resistance to compression. Furthermore, when poured into water, the product prepared according to Example 1 will not become dissolved or suspended, but will collect at the bottom and will retain its substantially spherical character even for prolonged periods such as one week. A certain degree of swelling will occur, and is estimated to be by a factor of about 1.2. The fact that the product is non-dusting, shows high mechanical strength and retains its character when immersed in water is believed to be very advantageous when the product is to be used as constituent of fodder compositions, especially for ruminants.

We claim:

1. A process for converting a solution or suspension including recycled material into a dried particulate product in a material cycling system including a pneumatic conveyor dryer and a mixer-granulator, said process comprising:
   a. mixing in said mixer-granulator, the solution of suspension with recycled material consisting of dried particulate material of smaller particle size than the desired final product, to obtain particles of a higher moisture content than that of the desired final product,
   b. feeding the resulting particles into and conveying them through said pneumatic conveyor dryer without any substantial disintegration of said particles,
   c. classifying dried particulate product discharged from the pneumatic conveyor dryer into a fraction of desired particle size range, an undersize fraction, and, if present, an oversize fraction,
   d. withdrawing particles of desired size range as final product,
   e. disintegrating oversize particles, if any, and
   f. recycling the disintegration product together with undersize particles into said mixer-granulator.

2. A process according to claim 1, wherein part of the fraction of desired particle size range is disintegrated and recycled to the mixer-granulator together with undersize particles and disintegrated oversize particles, if any.

3. A process according to claim 1, wherein a high speed rotary mixer-granulator is used.

4. A process according to claim 3, wherein the high speed rotary mixer-granulator used is an upright spiral path granulator.

5. A process according to claim 1, wherein the particles discharged from the mixer-granulator are passed from the mixer-granulator through a tube or duct to the pneumatic conveyor dryer essentially by gravitational pull.

6. A process according to claim 5, wherein any part of the lower generatrix of the tube or duct defines an angle with vertical of no more than 35°.

7. A process according to claim 5, wherein the angle is less than 25°.

8. A process according to claim 7, wherein the angle is 10°–25°.

9. A process according to claim 8, wherein the angle is 15°–20°.

10. A process according to claim 1, wherein the relative amount of recycled material to feed solution or suspension is above 5:1, calculated on dry solids basis.

11. A process according to claim 10, wherein the total solids of the feed solution or suspension is 10–75% by weight, and the total solids content of the recycled material is 80–100% by weight.

12. A process according to claim 1, wherein the particle size distribution of the recycled material and the relative amounts of recycled material and solution or suspension are so selected that the particles formed in the mixer-generator and passed into the conveyor drier show substantially a non-equilibrium moisture distribution with an interior part of lower moisture content and a surface part of higher moisture content.

13. A process according to claim 12, wherein the particles discharged from the mixer-granulator are passed from the mixer-granulator through a tube or duct to the pneumatic conveyor dryer essentially by gravitational pull.

14. A process according to claim 13, wherein any part of the lower generatrix of the tube or duct defines an angle with vertical of no more than 35°.

15. A process according to claim 12, wherein the total solids content of the feed solution or suspension is 15–35% by weight, and the total solids content of the recycled material is 85–95% by weight.

16. A process according to claim 15, wherein the feed is a single cell protein suspension, and the ratio of the relative amount of recycled material to feed suspension is 20–30:1, calculated on dry solids basis.

17. A process according to claim 16, wherein at least 90% by weight of the recycled material has a mean particle size which is 70–95% of the mean particle size of the final product.

18. A process according to claim 17, wherein at least 90% by weight of the recycled material has a mean particle size which is 80–90% of the mean particle size of the final product.

19. A process according to claim 1, wherein the particle size distribution of the recycled material and the relative amounts of recycled material and solution or suspension are so selected that the particles formed in the mixer-granulator show substantially a non-equilibrium moisture distribution with an interior part of higher moisture content powdered with fragments of lower moisture content.

20. A process according to claim 19, wherein the total solids content of the feed solution or suspension is 15–35% by weight, and the total solids content of the recycled material is 85–95% by weight.

21. A process according to claim 20, wherein the feed is a single cell protein suspension, and the ratio of the relative amount of recycled material to feed suspension is 10–20:1, calculated on dry solids basis.

22. A process according to claim 21, wherein at least 10% by weight of the recycled material has a mean particle size which is smaller than 25% of the mean particle size of the final product.

23. A process according to claim 22, wherein 15–25% by weight of the recycled material has a mean particle size which is smaller than 25% of the mean particle size of the final product.

24. A process according to claim 1, wherein the velocity of the drying air in the throat section of the pneumatic conveyor dryer is 40–100 meters per second, and the velocity of the drying air in the pneumatic conveyor dryer duct is 8–20 meters/second.

25. A process according to claim 24, wherein the velocity of the drying air in the throat section of the pneumatic conveyor dryer is 50–80 meters/second, and the velocity of the drying air in the pneumatic conveyor dryer duct is 10–16 meters/second.

26. A process according to claim 24, wherein the inlet temperature of the drying air is 250°–600° C.

27. A process according to claim 26, wherein the inlet temperature of the drying air is 400–500° C.

28. A process according to claim 1, wherein the drying air is introduced into the throat section of the pneumatic conveyor dryer in a state of turbulent flow.

29. The product produced by the process of claim 1.

30. An apparatus for converting a solution or suspension into a dried particulate product comprising a mixer-granulator means for mixing a solution or suspension with a particulate recycle material, a non-disintegrator pneumatic conveyor dryer, means for feeding particles formed in the mixer-granulator means into the pneumatic conveyor drier, means for classifying particles discharged from the pneumatic conveyor dryer for recovering a dried particulate product and particulate recycle material, and means for recycling particles from the classifying means into the mixer-granulator.

31. An apparatus according to claim 30, wherein the mixer-granulator is a high speed rotary mixer-granulator.

32. An apparatus according to claim 31, wherein the high speed rotary mixer-granulator is an upright spiral path granulator.

33. An apparatus according to claim 30, wherein the means for feeding the particles from the mixer-granulator into the pneumatic conveyor dryer is a tube or duct.

34. An apparatus according to claim 33, wherein any part of the lower generatrix of the tube or duct defines an angle with vertical of no more than 35°.

35. An apparatus according to claim 33, wherein the angle is less than 25°.

36. An apparatus according to claim 35, wherein the angle is 10°–25°.

37. An apparatus according to claim 36, wherein the angle is 15°–20°.

38. An apparatus according to claim 30, comprising means for obstructing the flow of the drying air upstream of the throat section of the pneumatic conveyor dryer for providing turbulent flow of the drying air into said throat section.

39. An apparatus according to claim 38, wherein said obstructing means is a right angle tube joint.

* * * * *